US008818350B2

(12) United States Patent
Brush et al.

(10) Patent No.: US 8,818,350 B2
(45) Date of Patent: Aug. 26, 2014

(54) CONTEXT-DRIVEN DATA SHARING (75) Inventors: Alice Jane Bernheim Brush, Bellevue, WA (US); Junius A. Gunaratne, New York, NY (US)

(73) Assignee: Microsoft Corporation, Redmond, WA (US)

( * ) Notice: Subject to any disclaimer, the term of this patent is extended or adjusted under 35 U.S.C. 154(b) by 372 days.

(21) Appl. No.: 12/819,245

(22) Filed: Jun. 21, 2010

(65) Prior Publication Data

US 2011/0312303 A1 Dec. 22, 2011

(51) Int. Cl.
H04M 3/00 (2006.01)

(52) U.S. Cl.
USPC .......................... 455/420; 455/418; 455/419

(58) Field of Classification Search
USPC ............. 455/418, 420, 425, 456.1, 457, 41.1, 455/41.3, 556.2; 709/227–229
See application file for complete search history.

(56) References Cited

U.S. PATENT DOCUMENTS

| 7,106,725 | B2 | 9/2006 | Andaker et al. |
| 7,970,436 | B1* | 6/2011 | Katzer et al. ................. 455/557 |
| 2002/0173345 | A1 | 11/2002 | Swerup et al. |
| 2006/0128306 | A1* | 6/2006 | Jung et al. .................... 455/41.2 |
| 2008/0090592 | A1* | 4/2008 | Tsuchiya ................... 455/456.6 |
| 2008/0096544 | A1 | 4/2008 | McNamara et al. |
| 2008/0146256 | A1 | 6/2008 | Hawkins et al. |
| 2009/0135806 | A1* | 5/2009 | Pulhug .......................... 370/352 |
| 2009/0181699 | A1 | 7/2009 | Tysowski |
| 2009/0254614 | A1* | 10/2009 | Brush et al. ................... 709/204 |
| 2009/0307361 | A1* | 12/2009 | Issa et al. .................... 709/229 |
| 2009/0327282 | A1* | 12/2009 | Wittig et al. ...................... 707/5 |
| 2010/0029302 | A1 | 2/2010 | Lee et al. |
| 2010/0274569 | A1* | 10/2010 | Reudink ........................ 705/1.1 |
| 2011/0312303 | A1* | 12/2011 | Brush et al. ............... 455/414.1 |

OTHER PUBLICATIONS

Gunaratne, J. et al.; "Newport: Enabling Sharing During Mobile Calls"; Proceedings of the 28th International Conference on Human Factors in Computing Systems; CHI 2010; Atlanta, GA; Apr. 10-15, 2010; pp. 343-352.

Vasile, Cosmin., "Display Your Symbian Phone Screen on a PC", Retrieved at << http://news.softpedia.com/news/Display-Your-Symbian-Phone-Screen-on-a-PC-104756.shtml >>, Feb. 17, 2009, pp. 3.

"MyMobiler v1.25", Retrieved at << http://www.mymobiler.com/ >>, Feb. 7, 2008, p. 1.

"Remote Control Windows Mobile Phone from Desktop Computer", Retrieved at << http://www.labnol.org/gadgets/phones/remote-control-mobile-phone-desktop-computer/1677/ >>, Oct. 21, 2007, p. 1.

(Continued)

Primary Examiner — Magdi Elhag
(74) Attorney, Agent, or Firm — Dan Choi; Carole Boelitz; Micky Minhas (57) ABSTRACT

This patent application pertains to context-driven data sharing, and specifically to data sharing relating to a telephone call. One example can establish a telephone call between first and second computing devices. This example can also utilize the telephone call as at least part of a basis for temporarily adjusting a data sharing permission level on at least one of the first and second computing devices during the telephone call.

21 Claims, 7 Drawing Sheets

(56) References Cited

OTHER PUBLICATIONS

Barkhuus, et al., "From Awareness to Repartee: Sharing Location within Social Groups", Retrieved at << http://www.itu.dk/~barkhuus/connecto.pdf >>, Conference on Human Factors in Computing Systems, Proceeding of the twenty-sixth annual SIGCHI conference on Human factors in computing systems, Apr. 5-10, 2008, pp. 497-506.

Berry, et al., "Role-Based Control of Shared Application Views", Retrieved at << http://delivery.acm.org/10.1145/1100000/1095039/p23-berry.pdf?key1=1095039&key2=2496007621&coll=GUIDE&dl=GUIDE&CFID=77476489&CFTOKEN=19357457 >>, Symposium on User Interface Software and Technology, Proceedings of the 18th annual ACM symposium on User interface software and technology, Oct. 23-27, 2005, pp. 23-32.

Boyaci, et al., "Application and Desktop Sharing", Retrieved at << http://delivery.acm.org/10.1145/1370000/1364738/a75-boyaci.pdf?key1=1364738&key2=8417007621&coll=GUIDE&dl=GUIDE&CFID=79243925&CFTOKEN=80272748 >>, International Conference on Emerging Networking Experiments and Technologies, Proceedings of the 2007 ACM CoNEXT conference, Dec. 10-13, 2007, pp. 2.

Congleton, et al., "The ProD Framework for Proactive Displays", Retrieved at << http://delivery.acm.org/10.1145/1450000/1449752/p221-congleton.pdf?key1=1449752&key2=8527007621&coll=GUIDE&dl=GUIDE&CFID=77477049&CFTOKEN=864528 44 >>, Symposium on User Interface Software and Technology, Proceedings of the 21st annual ACM symposium on User interface software and technology, Oct. 19-22, 2008, pp. 221-230.

Consolvo, et al., "Location Disclosure to Social Relations: Why, When, & What People Want to Share", Retrieved at << http://www.placelab.org/publications/pubs/chi05-IocDisSocRel-proceedings.pdf >>, Conference on Human Factors in Computing Systems, Proceedings of the SIGCHI conference on Human factors in computing systems, Apr. 2-7, 2005, pp. 81-90.

Deosthali, Ajit., "Worldwide Bluetooth Semiconductor 2008-2012 Forecast", Retrieved at << http://www.idc.com/getdoc.jsp?containerid=214945 >>, Nov. 2008, pp. 2.

Enck, et al., "Exploiting Open Functionality in SMS-Capable Cellular Networks", Retrieved at << http://www.smsanalysis.org/smsanalysis.pdf >>, Conference on Computer and Communications Security, Proceedings of the 12th ACM conference on Computer and communications security, Nov. 7-11, 2005, pp. 12.

Stevens, et al., "Gartner Says Worldwide Smartphone Sales Grew 16 Percent in Second Quarter of 2008", Retrieved at << http://www.gartner.com/it/page.jsp?id=754112 >>, Retrieved Date: Feb. 24, 2010, pp. 3.

Garriss, et al., "Trustworthy and Personalized Computing on Public Kiosks", Retrieved at << http://www.kiskeya.org/ramon/work/pubs/mobisys08.pdf >>, International Conference on Mobile Systems, Applications and Services, Proceeding of the 6th international conference on Mobile systems, applications, and services, Jun. 17-20, 2008, pp. 12.

Huang, et al., "Kimono: Kiosk-Mobile Phone Knowledge Sharing System", Retrieved at << http://people.csail.mit.edu/kapu/papers/huang_mum05.pdf >>, ACM International Conference Proceeding Series, Proceedings of the 4th international conference on Mobile and ubiquitous multimedia, vol. 154, Dec. 8-10, 2005, pp. 8.

Karlson, et al., "Courier: A Collaborative Phone-Based File Exchange System", Retrieved at << http://research.microsoft.com/pubs/56154/tr-2008-05.pdf >>, Technical Report, MSR-TR-2008-05, Jan. 2008, pp. 17.

Kun, et al., "Co-Present Photo Sharing on Mobile Devices", Retrieved at << http://people.cs.uct.ac.za/~gaz/papers/leo1.pdf >>, Proceedings of the 9th Conference on Human-Computer Interaction with Mobile Devices and Services, Mobile HCI, Sep. 9-12, 2007, pp. 8.

Madhavapeddy, et al., "Audio Networking: The Forgotten Wireless Technology", Retrieved at << http://www.computer.org/portal/web/csdl/doi/10.1109/MPRV.2005.50 >>, IEEE Pervasive Computing, vol. 4, No. 3, Jul. 2005, pp. 1.

Paek, et al., "Toward Universal Mobile Interaction for Shared Displays", Retrieved at << http://research.microsoft.com/en-us/um/people/sdrucker/papers/cscw.pdf >>, Computer Supported Cooperative Work, Proceedings of the 2004 ACM conference on Computer supported cooperative work, Nov. 6-10, 2004, pp. 4.

Sadun, Erica., "Consumers, Not Providers, Ready for Ubiquitous Cellular Data", Retrieved at << http://arstechnica.com/telecom/news/2009/03/going-ubiquitous-with-cellular-data.ars >>, Mar. 1, 2009, p. 1.

Sarvas, et al., "Building Social Discourse around Mobile Photos: A Systemic Perspective", Retrieved at << http://users.tkk.fi/~giulio/p31-sarvas.pdf >>, ACM International Conference Proceeding Series, vol. 111, Proceedings of the 7th international conference on Human computer interaction with mobile devices & services, Sep. 19-22, 2005, pp. 31-38.

Sellen, et al., "The Whereabouts Clock: Early Testing of a Situated Awareness Device", Retrieved at << http://research.microsoft.com/en-us/groups/sds/whereaboutsclock.pdf >>, Conference on Human Factors in Computing Systems, CHI '06 extended abstracts on Human factors in computing systems, Apr. 22-27, 2006, pp. 6.

Wiltse, et al., "PlayByPlay: Collaborative Web Browsing for Desktop and Mobile Devices", Retrieved at << http://www.jeffreynichols.com/papers/p1781-wiltse.pdf >>, Conference on Human Factors in Computing Systems, Proceedings of the 27th international conference on Human factors in computing systems, Apr. 4-9, 2009, pp. 1781-1790.

Auletta, et al.; "Performance Evaluation of Web Services Invocation over Bluetooth"; PM2HW2n '06, Proceedings of the ACM international workshop on performance monitoring, measurement, and evaluation of heterogeneous wireless and wired networks, pp. 1-8.

Churchill, et al.; "Multimedia Fliers: Information Sharing with Digital Community Bulletin Boards"; Proceedings of the First International Conference on Communities and Technologies (C&T 2003), Aug. 31, 2003; pp. 97-117.

Voida, et al.; "Share and Share Alike: Exploring the User Interface Affordances of File Sharing"; Proceedings of the ACM Conference on Human Factors in Computing Systems (CHI 2006), Apr. 22-27, 2006; pp. 221-230.

* cited by examiner

CONTEXT-DRIVEN DATA SHARING

BACKGROUND

Traditionally, data sharing is an all or nothing scenario. For instance, a user of a mobile device may make his/her location information available to others or block access to the location information.

SUMMARY

This patent application pertains to context-driven data sharing, and specifically to scenarios where the context relates to a telephone call. One example can establish a telephone call between first and second computing devices. This example can also utilize the telephone call as at least part of a basis for temporarily adjusting a data sharing permission level on at least one of the first and second computing devices during the telephone call.

The above listed example is provided for introductory purposes and does not include all of, and/or limit, the claimed subject matter.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent application pertains to context-driven data sharing between devices. The term "data" as used herein can be any type of data, such as a text file, media file, physical location data, and/or other information. In one scenario, the context-driven data sharing can be associated with a telephone call. In such a scenario, the context can be the act of engaging in a telephone call. This context can be used as an indication that the user may desire to temporarily share more data with the other party than would normally be the case. Thus, the telephone call can be utilized as an authorization to change data sharing permissions associated with the other party for the duration of the telephone call. The data sharing permission adjustment can be tied to the telephone call (e.g. the permission adjustment can be for only the other party engaged in the telephone call and/or for only the duration of the telephone call). Other data sharing permission levels can be maintained at normal security settings.

Another context-driven data sharing scenario can involve first and second devices that are associated with a single user. For instance, a first computing device can be a relatively resource-rich computing device like a notebook or desktop computer (e.g. a personal computer, Apple-based computer or Linux-based computer). The second computing device can be a relatively resource-constrained device, such as a smart phone, cell phone, personal digital assistant (PDA), etc. that includes a telephone capability. The more robust first computing device can monitor for activity on the second computing device when the computing devices are proximate to one another. When activity, such as a telephone call, is detected the more robust first computing device can augment a functionality of the second computing device. For ease of explanation in the discussion that follows, the first computing device(s) may be referred to as "computer(s)" and the second computing device(s) may be referred to as "mobile phone(s)".

First Data Sharing Example

Figure 1:
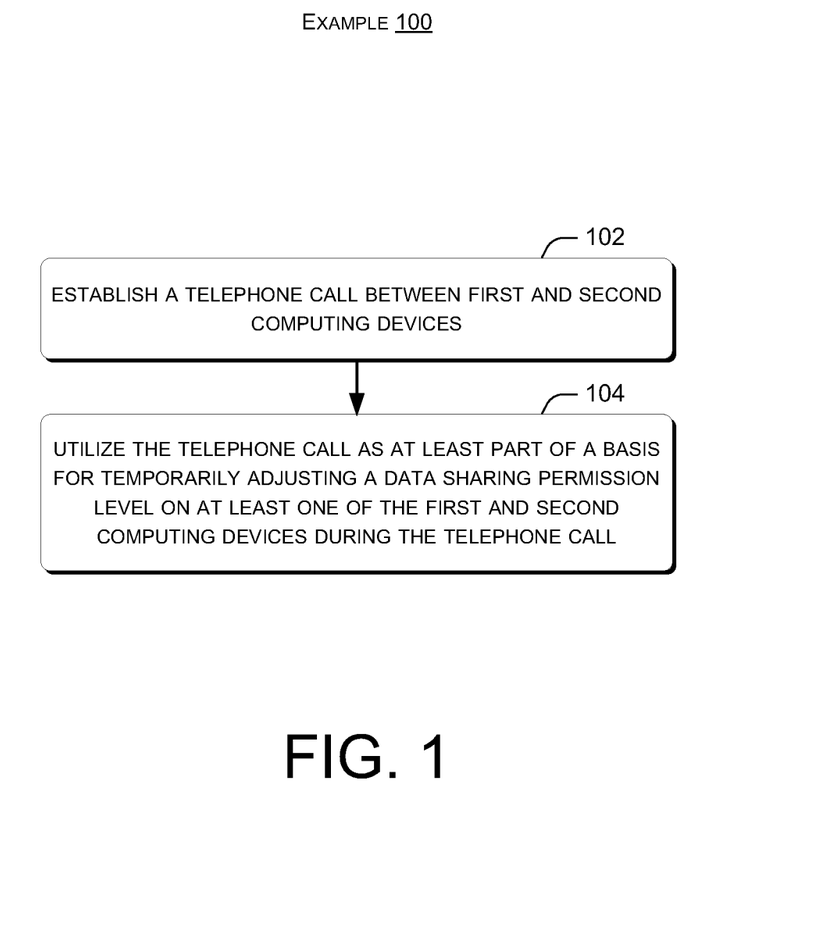
FIGS. 1 and 6 are flow charts for accomplishing context-driven data sharing concepts in accordance with some implementations.

FIG. 1 shows an introductory context-driven data sharing example 100.

In this example, a telephone call can be established between first and second computing devices at 102. In this case, the first and second computing devices can be thought of as mobile phones.

The telephone call can be utilized as, at least a part of, a basis for temporarily adjusting a data sharing permission level on at least one of the first and second computing devices during the telephone call at 104. For instance, the parties engaging in the telephone call may readily share their physical locations with one another if they are trying to find each other in an unfamiliar location. The permission level can be tied to the telephone call so that upon termination of the call the permission level is re-adjusted. In other instances, the adjusted permission level may be maintained after the telephone call, such as until the user re-adjusts the permission level.

Second Data Sharing Example

FIGS. 2-5 collectively show another context-driven data sharing example. This example includes a first mobile phone 202 and a second mobile phone 204. (For sake of brevity, only two mobile phones are illustrated, but the present concepts can be applied to more mobile phones, such as in a conference call scenario). In this case, mobile phone 202 includes a data-sharing permissions component 206 and mobile phone 204 includes a data-sharing permissions component 208. Briefly, the data-sharing permissions components can facilitate data sharing between two users engaged in a telephone call. In the illustrated example, the mobile phones 202 and 204 can have the capability to communicate over one or more networks 210, such as cellular or Wi-Fi networks.

This example illustrates how the data-sharing permissions components 206 and/or 208 can temporarily adjust the data sharing permissions relative to a telephone call. For purposes of explanation, assume that the users of mobile phones 202 and 204 are trying to find one another at a large and crowded event, such as a parade or fair. For the sake of brevity, only a single permission level indicated generally at 212 related to device location (i.e., the user's location) is illustrated. Other permissions relating to other data can be handled in a similar manner.

Figure 2:
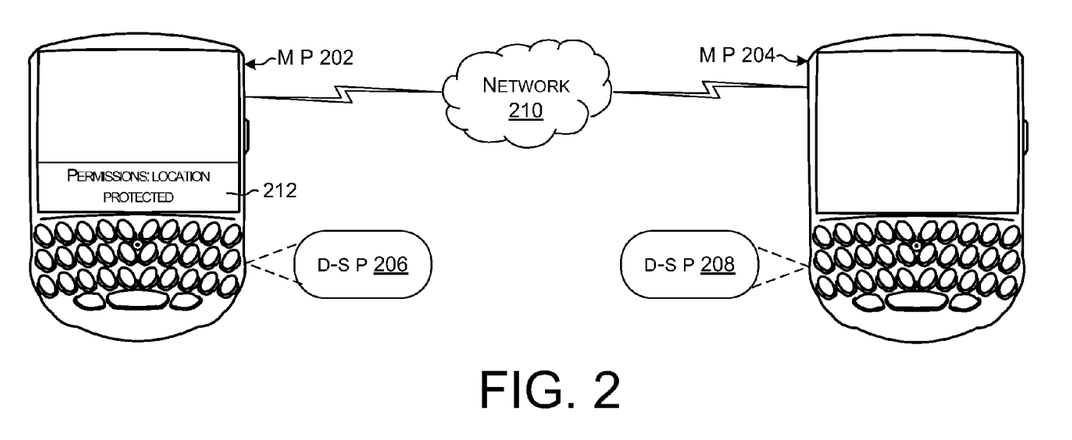
FIGS. 2-5 and 7-10 illustrate context-driven data sharing examples in accordance with some of the present concepts.

Beginning at FIG. 2 mobile phone 202 is not communicating with any other mobile phone. Permission level 212 indicates that the location data of mobile phone 202 is protected and thus is not shared with other mobile phones.

Figure 3:
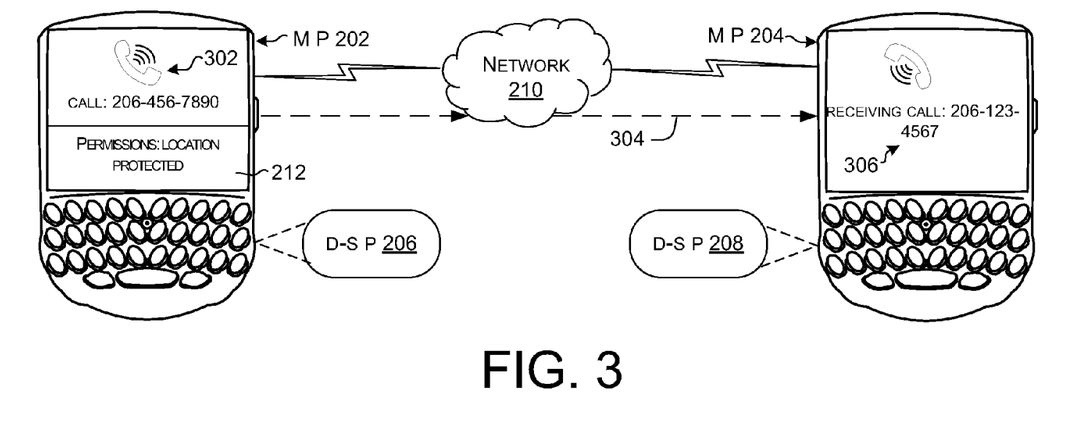

FIG. 3 shows the user choosing to place or initiate a telephone call at 302 to a number 206-456-7890 that happens to be associated with mobile phone 204. At this point permission level 212 is unchanged from the level of FIG. 2. As indicated by arrow 304 the telephone call may be made over network 210 or another network (not shown). The telephone call is received at mobile phone 204 as indicated at 306. The telephone number of the calling mobile phone (202) is shown to the user of mobile phone 204. The user of mobile phone 204 can choose to answer the telephone call or not answer the telephone call. Assume for purposes of explanation that the user of mobile phone 204 chooses to answer the call. Accordingly, both the calling party and the receiving party have chosen to take part in the telephone call. This context can be leveraged as an indication that there is some level of trust between the two parties that is higher than a basal level (at least temporarily).

Figure 4:
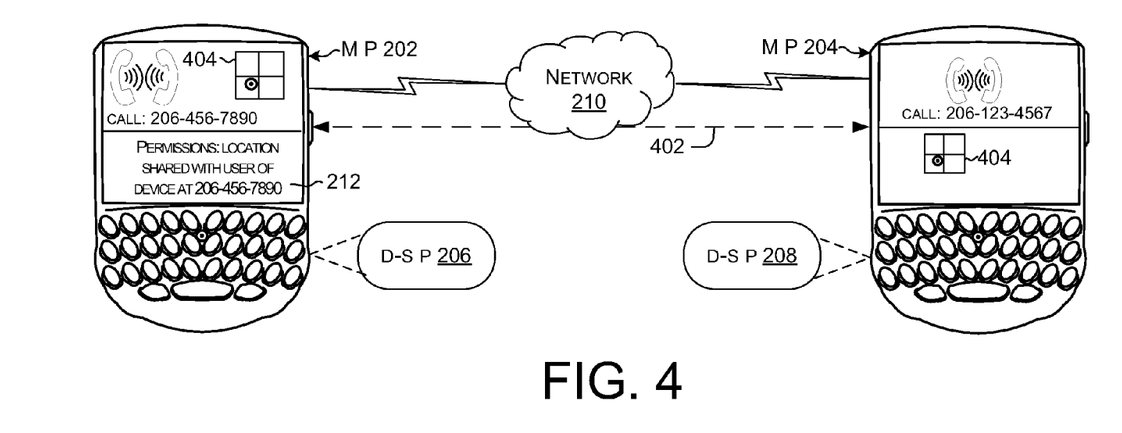

FIG. 4 shows the resultant telephone call established between mobile phones 202 and 204 as indicated by arrow 402. Further, in this case, the data-sharing permissions component 206 has changed location permission level 212 relative to mobile phone 204 based upon the trust level. Accordingly, location information represented by map 404 is available to mobile phone 204. Though not shown due to space constraints, some implementations can present a GUI on mobile phone 202 that asks the user whether he/she wants to grant the permission adjustment. Further, it should be noted that, at least in some implementations, the permission adjustment is specific to mobile phone 204 (i.e., the mobile phone engaged in the telephone call). The data-sharing permissions component 206 can maintain the original permission level for other mobile phones. Of course, while not shown for sake of brevity, data-sharing permissions component 208 can make a similar permission level adjustment on the receiving mobile phone 204. Further, relative to mobile phone 204, the permission level adjustment can be device wide or application specific, among others. For instance, the user may specify that he/she wants to adjust the location permission level (e.g., a global positioning system (GPS) application permission level), but leave other applications at an existing permission level.

Figure 5:
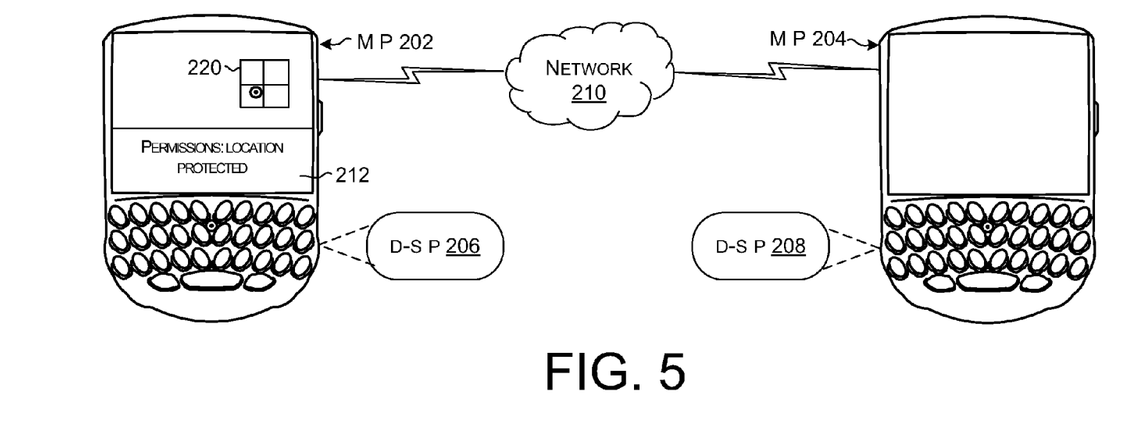

FIG. 5 shows the telephone call ended or terminated. The data-sharing permissions component 206 has returned (i.e., readjusted) the permission level 212 to its original protected state or level (e.g., equal to the permission level 212 of FIG. 2). As a result map 404 can be seen on mobile phone 202, but is unavailable on mobile phone 204.

In summary, the present implementations can support sharing data (e.g. location, photos, and/or notes) based upon context, such as during telephone calls. People can share while on a telephone call and sharing can end when the call ends or can be continued if desired by the user.

Third Data Sharing Example

Figure 6:
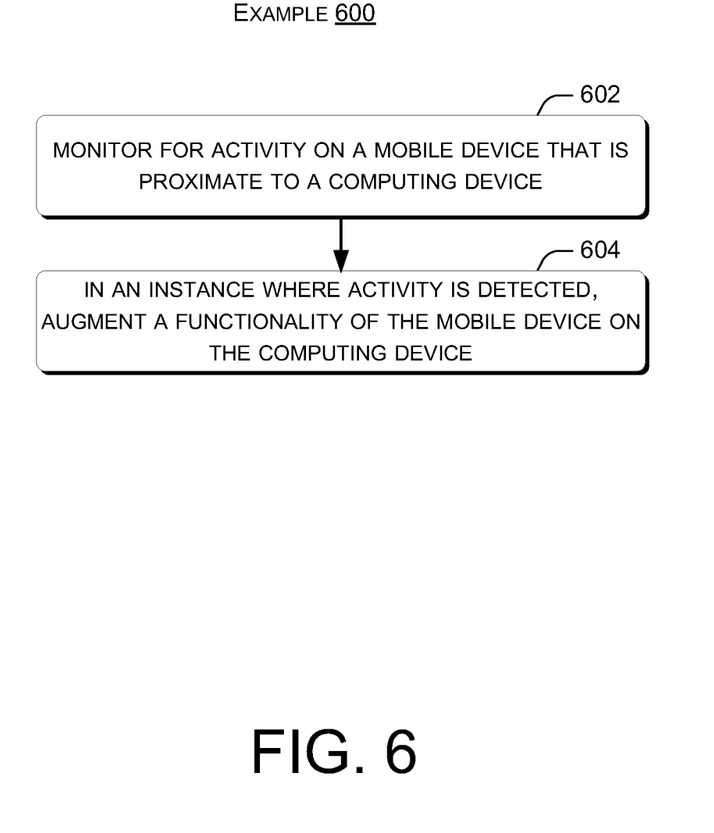

FIG. 6 shows another data sharing example 600. In this example, monitoring can be performed for activity on a mobile device or mobile phone that is proximate to a computer at 602. In some implementations, the mobile phone can be relatively more resource constrained than the computer. For instance, the mobile phone may be a Smartphone and the computing device might be a notebook or desktop computer. The mobile phone may be resource constrained relative to one or more resources, such as processing resources, memory, etc. A commonly encountered resource that tends to be scarce on mobile phones is screen space, whereas notebooks and desktop computers tend to have far more screen space.

In this example, assume that the two devices can communicate over a short range protocol such as Bluetooth. In circumstances where the two devices are close enough to communicate with one another, the computer can detect the presence of the mobile phone and/or detect whether there is activity on the mobile phone (e.g., whether the user is using the mobile phone).

If activity is detected, a functionality of the mobile phone can be augmented on the computer at 604. For instance, a GUI of an application that is running on the mobile phone may also be displayed on the computer. Thus, rather than looking at the application on a screen that is a few square inches, the user can look at the application on the computer on a display that is potentially hundreds of square inches. In summary, the present example can automatically enable "desktop screen sharing" when a user (and his/her mobile phone) are within range of his/her computer.

Fourth Data Sharing Example

Figure 7:
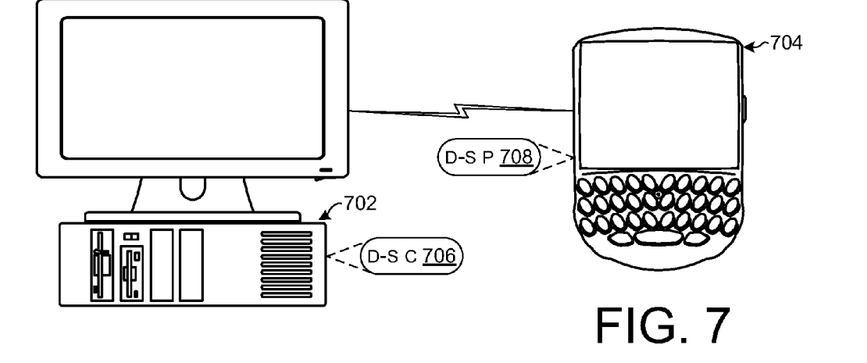
Figure 8:
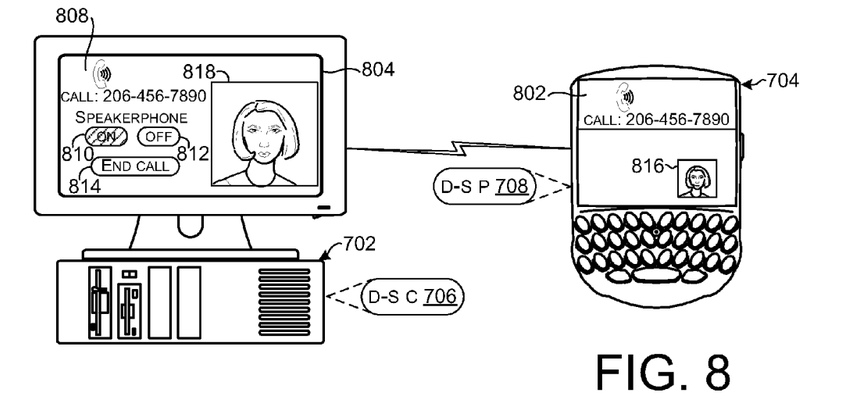
Figure 9:
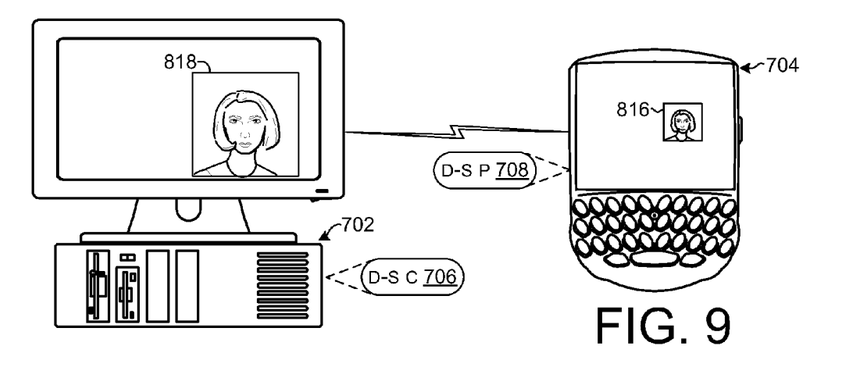

FIGS. 7-9 collectively show another data sharing example. This example includes a first computing device 702 and a second computing device 704. For purposes of explanation, in this example computing device 702 is manifest as (and will be referred to as) a desktop computer and computing device 704 is manifest as (and will be referred to as) a mobile phone. Also, assume that desktop computer 702 and mobile phone 704 are configured to communicate via Bluetooth or other technology. Further, desktop computer 702 includes a data-sharing cooperation component 706 and mobile phone 704 includes a data-sharing permissions component 708.

In traditional scenarios, computing devices such as desktop computer 702 and mobile phone 704 operate in isolation from one another even when they belong to the same user. In these traditional scenarios, any attempts to get the computing devices to work in a cooperative manner tend to require great effort on the part of the user. As such, these traditional solutions tend to go unutilized or at least underutilized. In contrast, the present implementations can offer automatic data sharing between the desktop computer 702 and mobile phone 704.

This automatic data sharing can be accomplished with little or no user effort. For instance, in one implementation, the data-sharing cooperation component 706 and the data-sharing permissions component 708 allow the user to perform an initial authorization and from then on data sharing can be performed automatically. In another implementation, the desktop computer and/or the mobile phone can initially auto-detect one another via Bluetooth or other technology. Upon detection, the user can be asked if he/she desires data sharing between the two devices. Once the user has authorized auto data sharing between a pair of devices, subsequent data sharing can be automatically started. If no previous pairing has occurred, either or both of the mobile phone and the desktop computer can scan for the presence of other computing devices that may be suitable for data sharing. An example of such subsequent automatic data sharing is described below.

In FIG. 7 desktop computer's data-sharing cooperation component 706 does not detect any activity on mobile phone 704 because the two devices are "out of range" and/or because mobile phone 704 is not being used. While not shown, in some implementations, an icon or other GUI may be shown on desktop computer 702 to indicate that it is monitoring relative to mobile phone 704.

FIG. 8 shows a subsequent view of desktop computer 702 and mobile phone 704 in response to the user placing a telephone call on mobile phone 704 as indicated at 802. This activity is picked up by the desktop computer's data-sharing cooperation component 706. The desktop computer's data-sharing cooperation component 706 can work cooperatively with the mobile phone's data-sharing permissions component 708. These components can launch a data sharing GUI 804 on desktop computer 702. In this case, data sharing GUI 804 occupies an entirety of the display area of desktop computer 702. In other implementations, the data sharing GUI 804 may occupy only a portion of the display area. In one such case, the data sharing GUI may be presented as a graphical window within the overall display area that may otherwise include content from desktop computer 702.

In this example, data sharing GUI 804 can augment the functionality offered on mobile phone 704. For instance, at 802 mobile phone 704 indicates that a telephone call is ongoing as well as the number called. This information is also reproduced on desktop computer 702 at 808. Further, desktop computer 702 has automatically turned on the speakerphone option on mobile phone 704 as indicated at 810. This feature can offer a seamless transition so that the user has his/her hands free to engage the keyboard and/or mouse (or other input device) of desktop computer 702. Further, the user is given the option of turning off the speaker phone as indicated at 812. Also, the user can end the telephone call on desktop computer 702 as indicated at 814. These are just a few examples of how the functionality of mobile phone 704 can be augmented on desktop computer 702. In this case, icons, such as 'on' icon 810 and 'off' icon 812 relating to the mobile phone are presented in the desktop computer. Other augmented functionality can be related to icons or be independent of icons.

The above described data sharing example can enable the user to seamlessly switch back and forth between mobile phone 704 and desktop computer 702. This implementation can also offer the user the opportunity to access files of (e.g., stored on) mobile phone 704 from desktop computer 702. For example, when the user clicks a photos button (not shown) on desktop computer 702, the desktop computer can access a file system of mobile phone 704 and display photos from the mobile phone on the desktop computer. For example, a photo that is presented on mobile phone 704 at 816 can also be presented on desktop computer 702 at 818. The user can enjoy a much larger version if desired on desktop computer 702 than is possible on mobile phone 704. (The relative display areas of the desktop computer and the mobile phone are not shown to scale in the FIGS. 7-9). This can allow the user to take advantage of the desktop computer's larger display and enhanced input capabilities. As will be discussed in more detail below relative to FIG. 10, the data-sharing cooperation component can also allow the user to send the photo or other data over a network that is available to desktop computer 702 but that may not be available to mobile phone 704.

In some implementations, data sharing ends when the telephone call ends. In other implementations, data sharing initiated relative to the telephone call can continue after the telephone call. For instance, FIG. 9 shows the photo (816 on the mobile phone and 818 on the desktop computer) after the telephone call has ended. In some implementations, the data sharing can be continued until the occurrence of a predefined parameter. For instance, data sharing can continue until the user takes mobile phone 704 'out of range'. In another case, data sharing can be terminated after a period, such as ten minutes of inactivity on either device relative to the shared data.

In summary, data-sharing cooperation component 706 can support the same features as those on the data-sharing permissions component introduced relative to FIGS. 2-5 and further described relative to FIG. 6. Further, the data-sharing cooperation component 706 can provide the option to launch desktop screen sharing if the caller is also near his/her computer. Data-sharing cooperation component 706 can facilitate accessing the mobile phone's files and functionality from the computer including putting the mobile phone in speakerphone mode or ending the call. This can enable the user to seamlessly switch back and forth between the mobile phone and computer. For example, when a user clicks the photos button on the computer, it accesses the mobile phone file system and displays photos from the mobile phone on the computer. This allows the user to take advantage of the computer's larger display and enhanced input capabilities.

Fifth Data Sharing Example

Figure 10:
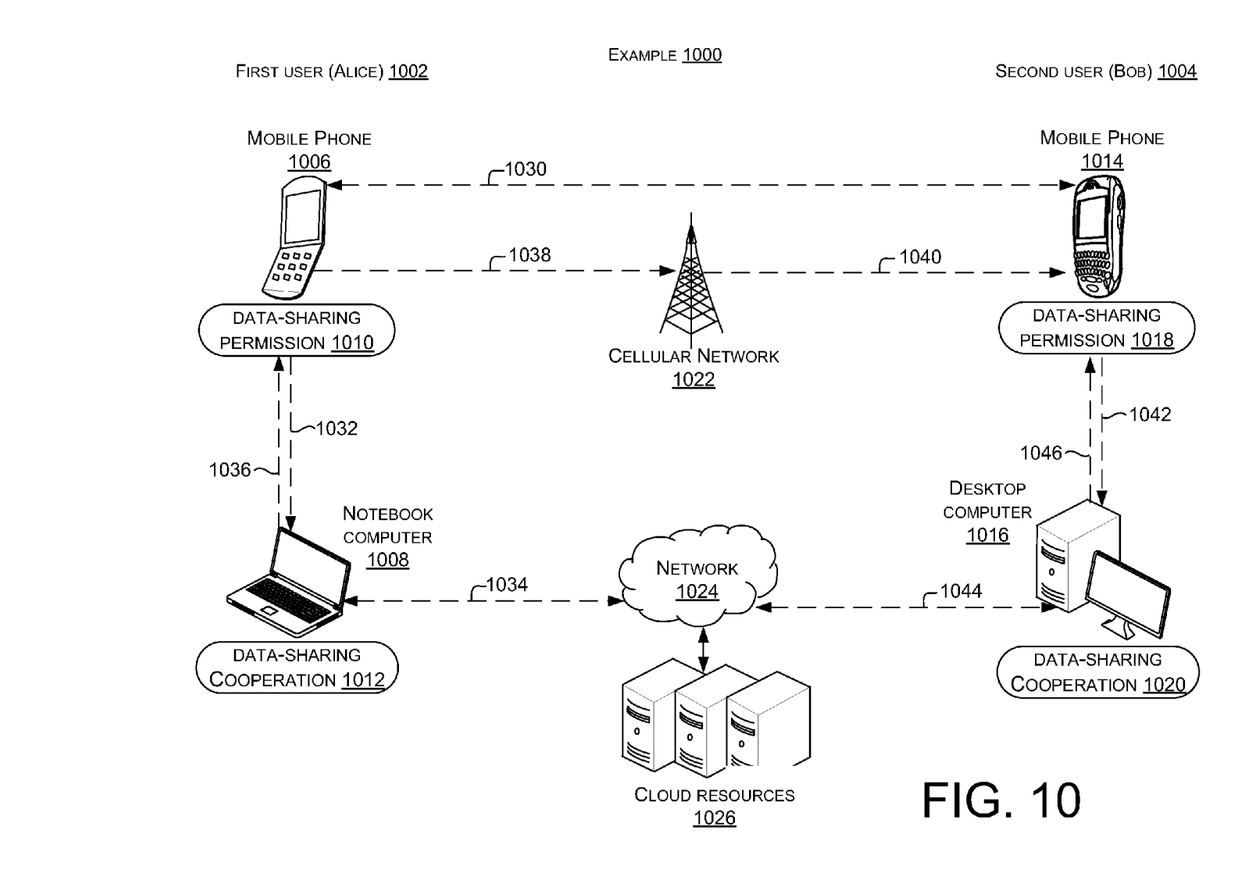

FIG. 10 shows another data sharing example 1000 that builds upon the concepts introduced above relative to FIGS. 1-9. This data sharing example is described in a scenario where a first user 1002, Alice, shares photos with a second user 1004, Bob, during a telephone phone call. Alice has a mobile phone 1006 and a notebook computer 1008. Mobile phone 1006 can include a data-sharing permission component 1010. Notebook computer 1008 can include a data-sharing cooperation component 1012.

Bob has a mobile phone 1014 and a desktop computer 1016. Mobile phone 1014 can include a data-sharing permission component 1018. Desktop computer 1016 can include a data-sharing cooperation component 1020. Mobile phones 1006 and 1014 can communicate over cellular network 1022. Notebook computer 1008 and desktop computer 1016 can communicate over a network 1024, such as the internet that can expose cloud resources 1026.

This example starts with Alice calling Bob on her mobile phone 1006 as indicated at 1030. Alice's notebook computer 1008 is paired to her mobile phone 1006 as discussed above relative to FIGS. 7-9. Accordingly, Alice's notebook computer 1008 (via data-sharing cooperation component 1012) can recognize the telephone call using Bluetooth and can augment the functionality of the mobile phone 1006. For instance, Alice's notebook computer 1008 can display caller identification information on its screen (via the mobile phone's data-sharing permission component 1010 and data-sharing cooperation component 1012).

Next, assume that Bob answers Alice's call on his mobile phone 1014. Assume further that as part of the telephone call, Alice sends a photo to Bob. Assume also that Bob's mobile phone 1014 and desktop computer 1016 are paired as discussed above. This implementation can transfer the photo from Alice's mobile phone 1006 to Alice's notebook computer 1008 via Bluetooth as indicated at 1032. Alice's notebook computer 1008 can upload the file corresponding to the photo to the cloud using Live Mesh™, Azure™, or other technique as indicated at 1034. A notice can be sent from Alice's notebook computer 1008 to her mobile phone 1006 that the file has been uploaded as indicated at 1036. At this point, Alice's mobile phone 1006 can send a message to Bob's mobile phone 1014 with information about how to obtain the file as indicated at 1038. In one case, the message can be sent as a Short Message Service (SMS) text message. In another case, the message can be sent as audio tones as part of the telephone call. In some cases, the message may indicate how to obtain the file in a simplified XML or other format. The use of SMS text messages to indicate how to obtain the file can offer several conveniences. For instance, SMS is already in widespread use and security concerns associated with SMS text messages have already been addressed.

The text message can be received on Bob's mobile phone 1014 as indicated at 1040. On Bob's mobile phone, the SMS text message received at 1040 can be checked by data-sharing permission component 1018 for suitable XML tags that contain file location information or events related to the present data sharing concepts. Text messages without such tags can be ignored and sent to the default message service on Bob's mobile phone 1014. In such a case where the SMS message was not related to data sharing, the SMS message can be presented on Bob's mobile phone in a traditional manner. Another implementation can employ a cloud server (not shown) that is accessed by mobile phones 1006 and 1014. Each mobile phone can register with the cloud server. Then, each time a telephone call occurs, the individual mobile phones can check to see if the other mobile phone is also registered with the cloud server. If both mobile phones engaged in the telephone call are registered then the sharing can happen through the server.

Returning to the SMS example, when a data sharing SMS message arrives at Bob's mobile phone 1014, his mobile phone can send the file name over Bluetooth or other technology to his desktop computer 1016 as indicated at 1042. Desktop computer 1016 can download the file from cloud services at 1044. Bob's desktop computer 1016 can then send the file of the photo via Bluetooth to Bob's mobile phone 1014 as indicated at 1046.

In an alternative scenario where Bob is not near his desktop computer 1016, his mobile phone's data connection can download the file. Further, Bob may initially be near his desktop computer 1016, but may want to leave. The present implementations can sense when the signal is lost between mobile phone 1014 and desktop computer 1016 and can responsively switch from a cooperative mode to a stand-alone mode that allows Bob to leave with his mobile phone 1014. Thus, Bob can leave the desktop computer 1016 and solely use the mobile phone 1014 when mobility is desired without disrupting an ongoing conversation on the mobile phone. The user would continue to enjoy the benefit of data sharing with the user of mobile phone 1006. The user would simply lose whatever augmentation of mobile phone 1014 was being provided by desktop computer 1016 until the user returned and mobile phone 1014 and desktop computer 1016 once again detect one another.

Sixth Data Sharing Example

Figure 11:
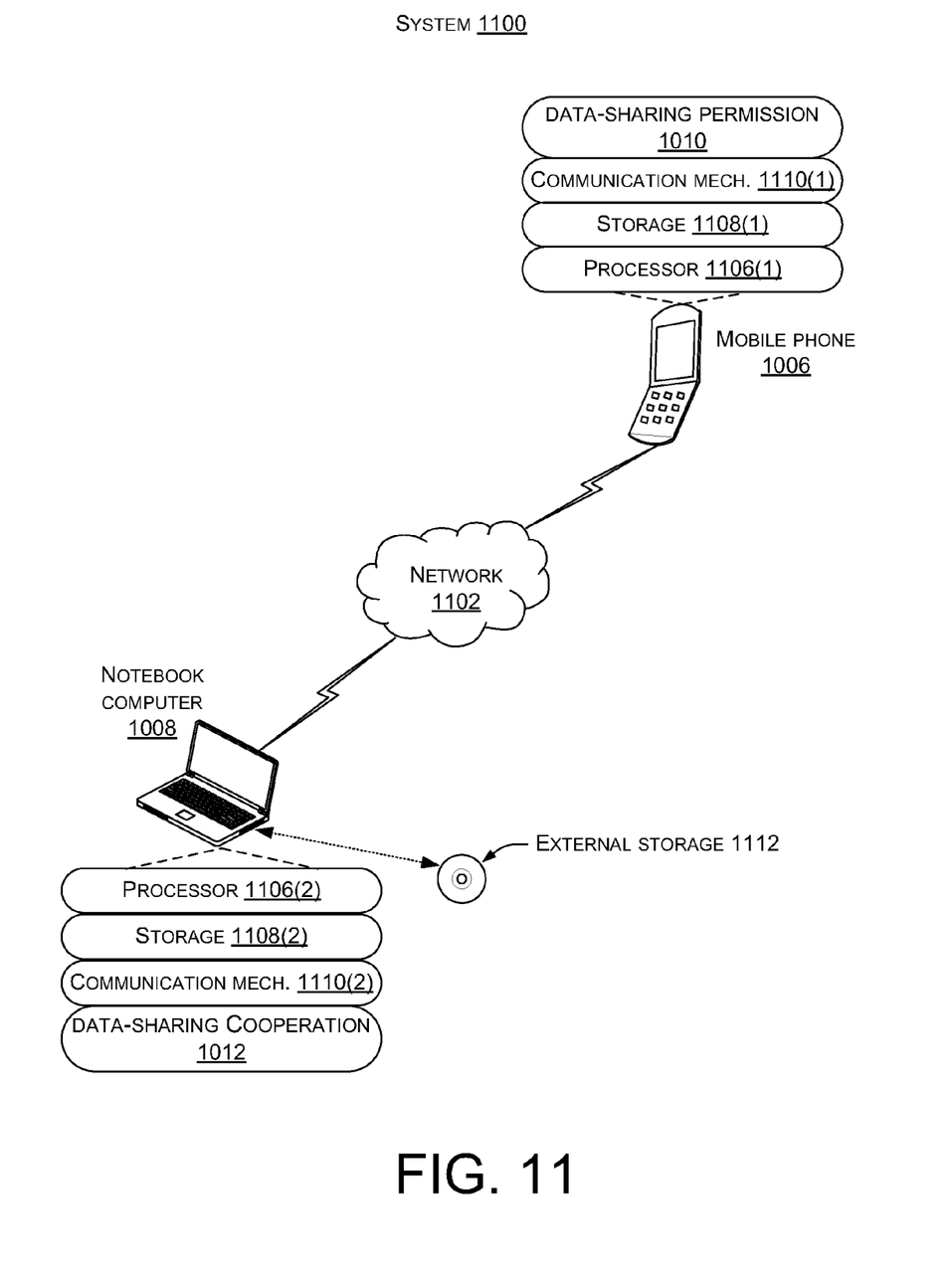
FIG. 11 illustrates some additional components of FIG. 10 in greater detail in accordance with some implementations.

FIG. 11 shows an example of a data sharing system 1100. For ease of explanation, data sharing system 1100 includes mobile phone 1006 and notebook computer 1008 from FIG. 10. Mobile phone 1006 and notebook computer 1008 can communicate over one or more networks indicated generically at 1102.

In this case, mobile phone 1006 and laptop computer 1008 can each include a processor 1106, storage 1108, and a communication mechanism 1110. (A suffix '(1)' is utilized to indicate an occurrence of these components on the mobile phone 1006 and a suffix '(2)' is utilized to indicate an occurrence on the notebook computer 1008). Mobile phone 1006 also includes data-sharing permission component 1010 and notebook computer 1008 includes data-sharing cooperation component 1012.

Processor 1106 can execute data in the form of computer-readable instructions to provide a functionality. Data, such as computer-readable instructions, can be stored on storage 1108. The storage can include any one or more of volatile or non-volatile memory, hard drives, and/or optical storage devices (e.g., CDs, DVDs etc.), among others. The mobile phone 1006 and/or notebook computer 1008 can also be configured to receive and/or generate data in the form of computer-readable instructions from an external storage 1112.

Examples of external storage 1112 can include optical storage devices (e.g., CDs, DVDs etc.), hard drives, and flash storage devices (e.g., memory sticks or memory cards), among others. In some cases, data-sharing permission component 1010 can be installed on the mobile phone 1006 during assembly or at least prior to delivery to the consumer. In other scenarios, data-sharing permission component 1010 can be installed by the consumer, such as a download available over network 1102 and/or from external storage 1112. Similarly, notebook computer 1008 can be shipped with data-sharing cooperation component 1012. Alternatively, the data-sharing cooperation component can be added subsequently from network 1102 or external storage 1112.

As mentioned above data-sharing permission component 1010 can allow data sharing relative to a telephone call. Further, data-sharing permission component 1010 can operate with data-sharing cooperation component 1012 to cooperatively augment the functionality of the mobile phone 1006 on the desktop computer 1008 when the two are in proximity to one another.

In one implementation, the data-sharing permission component 1010 and the data-sharing cooperation component 1012 can be written in Microsoft brand .NET C# and C. In this implementation, data-sharing permission components on the mobile phone can be developed to run on Windows brand Mobile 6.1. Further, in one implementation, to access phone call functions, data-sharing permission and cooperation components can rely on the .NET compact framework and Microsoft's Telephony Application Programming Interface (TAPI)™. Bluetooth communication between the mobile phone and the desktop computer can be done over a Bluetooth serial connection. The desktop computer can listen for Bluetooth requests from the phone and can open Bluetooth network communication streams as necessary. Shared files are stored online using the Microsoft LiveMesh2 or Azure™ cloud data storage service, though other cloud storage solutions could work as well.

CONCLUSION

In summary, the above described concepts can offer trusted sharing between parties based upon context, such as a telephone call. Also, a functionality of a user's mobile phone can be automatically augmented on the user's computer to better utilize the computing resources in a cooperative manner. Stated another way, some implementations can provide context-driven data sharing. In some instances, the context can relate to the user engaging in a telephone call with another user. Such a context can be used to adjust a data sharing permission level from a normal level. The adjusting can be tied to the telephone call and to the specific devices engaged in the telephone rather than all devices.

The order in which the above listed examples and/or methods are described is not intended to be construed as a limitation, and any number of the described blocks or acts can be combined in any order to implement the method, or an alternate method. Furthermore, the method can be implemented in any suitable hardware, software, firmware, or combination thereof such that a computing device can implement the method and/or cause the method to be implemented. In one case, the method is stored on a computer-readable storage media as a set of instructions such that execution by a computing device causes the method to be performed.

Although techniques, methods, devices, systems, etc., pertaining to trusted data sharing where the trust relates to engaging in a telephone call are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A hardware computer-readable memory device or hardware storage device having instructions stored thereon that, when executed by a hardware processor, cause the hardware processor to perform acts comprising:
    establishing a telephone call between a first computing device associated with a first user and a second computing device associated with a second user;
    utilizing the telephone call as at least part of a basis for temporarily adjusting a data sharing permission level on the first computing device during the telephone call; and
    allowing the first user to share a file stored on the first computing device with the second user, the sharing comprising:
        using short range communication with another computing device, providing the another computing device with access to the file stored on the first computing device, and sending the file from the first computing device to the another computing device, and
        sending, from the first computing device to the second computing device, a message with information identifying how the file sent from the first computing device to the another computing device can be obtained from the another computing device.

2. The computer-readable memory device or storage device of claim 1, wherein the establishing comprises initiating the telephone call on the first computing device.

3. The computer-readable memory device or storage device of claim 1, wherein the establishing comprises answering the telephone call on the first computing device.

4. The computer-readable memory device or storage device of claim 1, wherein the temporarily adjusting comprises offering the user of the first computing device an opportunity to authorize the temporarily adjusting after the telephone call is established.

5. The computer-readable memory device or storage device of claim 1, the acts further comprising automatically re-adjusting the data sharing permission level upon termination of the telephone call.

6. The computer-readable memory device or storage device of claim 1, wherein the temporarily adjusting the data sharing permission level is performed for individual applications of the first computing device.

7. The computer-readable memory device or storage device of claim 6, the acts further comprising presenting a graphical user interface on the first computing device to allow the user of the first computing device to specify individual applications for the temporarily adjusting.

8. The computer-readable memory device or storage device of claim 1, wherein the first computing device comprises a cell phone, smart phone, mobile phone, or personal digital assistant and the short range communication comprises short range wireless communication.

9. A computing device comprising:
    at least one volatile or non-volatile storage device storing computer-readable instructions configured to:
        monitor for activity on a mobile device that is proximate to the computing device, the mobile device being associated with a first user; and
        in an instance where activity indicating that the mobile device is in use is detected, share a file stored on the mobile device with a second user, wherein, to share the file, the computer-readable instructions are further configured to:
            display a graphical user interface on the computing device,
            receive a user selection of the file stored on the mobile device, the user selection being received via the graphical user interface on the computing device,
            obtain the file from the mobile device using short range communication with the mobile computing device, and
            send the file to the second user; and
    at least one hardware processor configured to execute the computer-readable instructions.

10. The computing device of claim 9, wherein the short range communication is performed using wireless technology.

11. The computing device of claim 9, wherein the activity relates to a telephone call between the mobile device and another mobile device that is associated with the second user.

12. The computing device of claim 11, wherein the graphical user interface is running on both the mobile device and the computing device during the telephone call.

13. The computing device of claim 11, wherein the computer-readable instructions are configured to end the telephone call responsive to an input received from the first user to the computing device.

14. The computing device of claim 9, wherein, to send the file to the second user, the computer-readable instructions are configured to upload the file to a cloud service over a network that is not available to the mobile device.

15. The computing device of claim 14, wherein the computer-readable instructions are configured to send the mobile device a notice indicating that the file has been uploaded to the cloud service.

16. A mobile device comprising:
    at least one volatile or non-volatile storage device storing computer-readable instructions configured to:
        establish a telephone call with a second mobile device, wherein the telephone call is between a first user of the mobile device and a second user of the second mobile device,
        utilize the telephone call as at least part of a basis for allowing another computing device to access a file stored on the mobile device during the telephone call, and
        share the file stored on the mobile device with the second user of the second mobile device, wherein, to share the file, the computer-readable instructions are further configured to:
            send the file from the mobile device to the another computing device using short range communication with the another computing device, and
            send, from the mobile device to the second mobile device, a message with information identifying how the second user can obtain the file from the another computing device; and
    at least one hardware processor configured to execute the computer-readable instructions.

17. The mobile device of claim 16, wherein the message is a Short Message Service text message.

18. The mobile device of claim 16, wherein the message is in a markup language format and includes tags with file location information associated with the file.

19. The mobile device of claim 18, wherein the markup language format is an Extensible Markup Language (XML) format.

20. The mobile device of claim 16, wherein the computer-readable instructions are further configured to:
   send the message to the second mobile device over a cellular network,
   wherein the short range communication used to send the file to the another computing device is performed using a short-range wireless connection.

21. The mobile device of claim 20, wherein the short-range wireless connection is a Bluetooth connection.

* * * * *